Aug. 31, 1965    E. J. SIMICICH    3,203,212
EXPLOSIVE FORMING BY ELECTRICAL DISCHARGE METHOD AND APPARATUS
Filed March 1, 1963    2 Sheets-Sheet 1

INVENTOR.
ESPERANTO J. SIMICICH
BY
*George Sullivan*
Agent

INVENTOR.
ESPERANTO J. SIMICICH
BY
George C. Sullivan
Agent

United States Patent Office 3,203,212
Patented Aug. 31, 1965

3,203,212
EXPLOSIVE FORMING BY ELECTRICAL DISCHARGE METHOD AND APPARATUS
Esperanto J. Simicich, Huntsville, Ala., assignor to Lockheed Aircraft Corporation, Burbank, Calif.
Filed Mar. 1, 1963, Ser. No. 262,075
7 Claims. (Cl. 72—56)

This invention relates to a method and apparatus for explosive forming members into the configuration of a die, and more particularly to a method and apparatus for explosive forming of tubular members into the configuration of a die by electrical discharge.

To meet stringent size and space requirements, aircraft designers have been required to design irregular sizes and shapes of various components, such as ducts. The translation of these design shapes into structurally strong lightweight components at a reasonable price has severely exercised the ingenuity of the manufacturing engineers and has made it mandatory for them to find better methods and apparatus for manufacturing irregular and nonstandard shaped parts. Designers have taken great liberty in the design of the tubular members in aircraft, such as ducts, for example; and efforts toward the reduction of the manufacturing costs of such tubular ducts resulted in this invention. Heretofore, tubular ducts of different diameter have been formed by forming thin sheet metal parts into tubular form and seam welding them into a cylindrical duct and then interconnecting the cylindrical duct parts through the intermediary of a transition part by welding, the transition part being formed into frustro-conical configuration by spin forming a previously blanked round disc. Such method of manufacturing, it will be appreciated, is quite expensive due to the many forming and welding operations required to form the part. To reduce the timing cost of manufacturing such part, there is provided in accordance with this invention a method and apparatus for forming tubing into the configuration of a die by the use of high velocity compression or shock waves generated by electrical discharge.

Accordingly, it is an object of this invention to provide a member formed into a desired configuration by the force of electrical discharge generated pressure waves.

Another object of this invention is to provide a tubular member formed into a desired die configuration by generating pressure waves along the length of the tubular member by electrical discharge to form it into the configuration of a containing die.

Another object of this invention is to provide an electrical discharge forming apparatus having a plurality of spaced apart electrical discharge devices thereon.

Other objects and advantages will become apparent from the following description taken in connection with the accompanying drawings in which.

Generally stated, this invention relates to a method and apparatus for electrical discharge forming of work pieces into a desired configuration wherein a work piece or member is placed in a die, and pressure waves are generated by electrical discharge to form the work piece into the configuration of the die.

Figure 1:
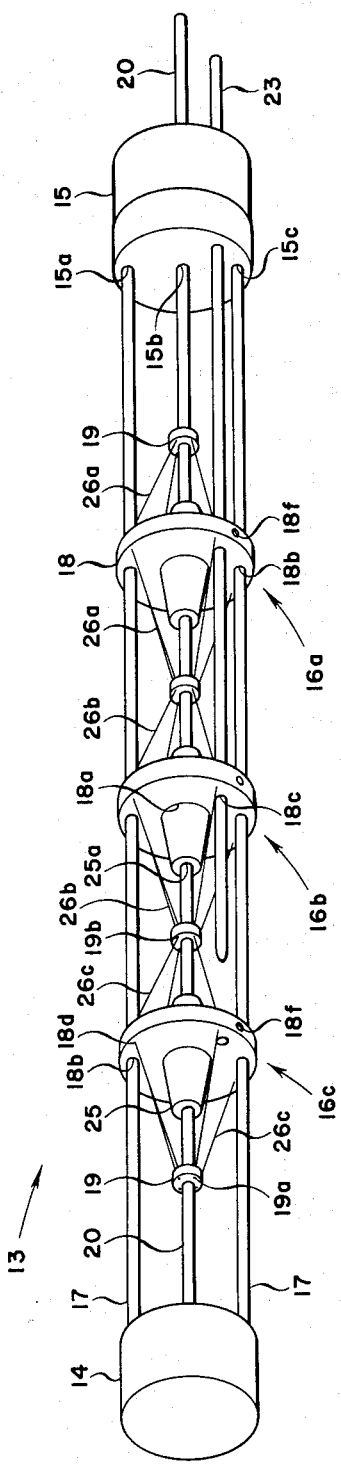
FIGURE 1 is a perspective view of one embodiment of an electrical discharge explosion forming apparatus made in accordance with this invention.
Figure 2:
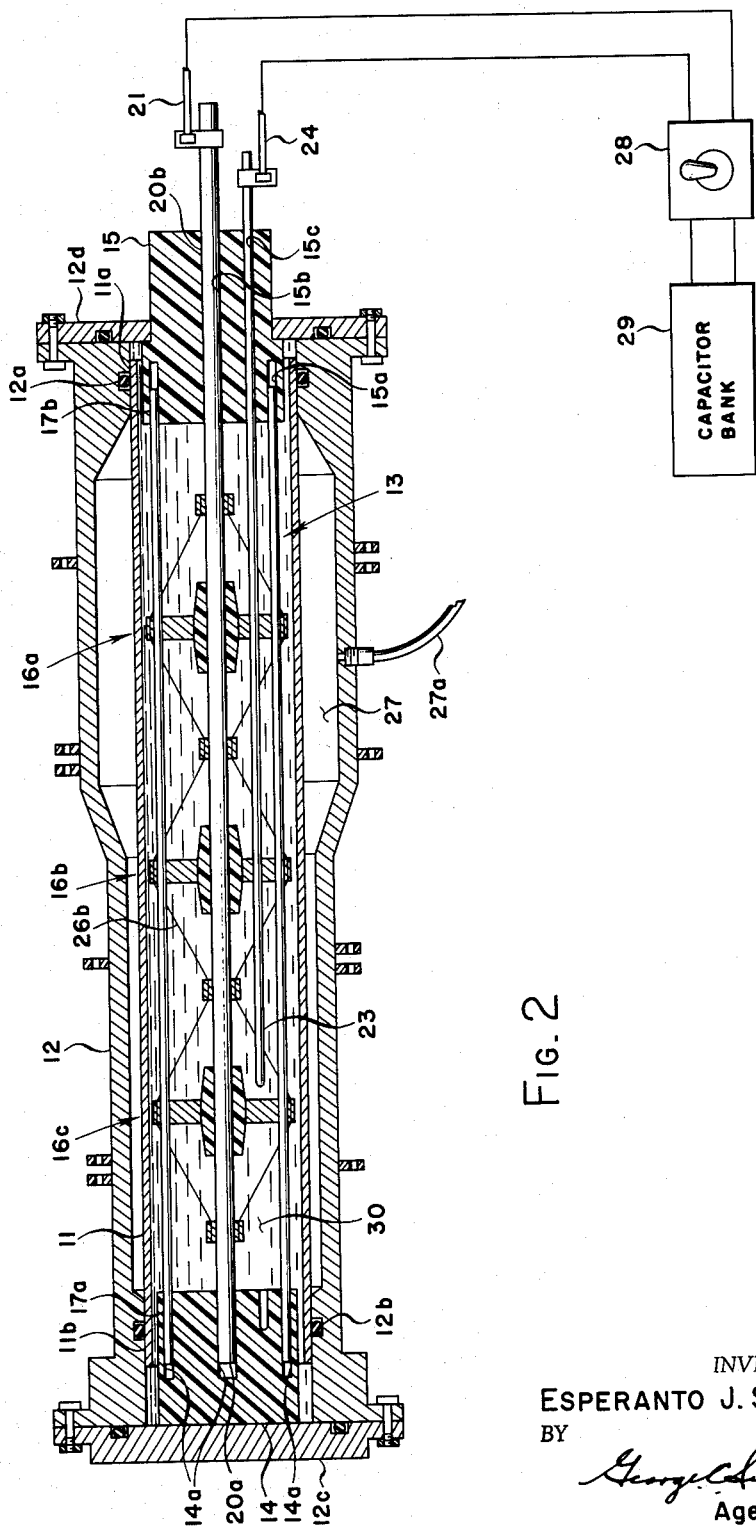
FIGURE 2 is a cross-sectional side view of the forming apparatus of FIGURE 1 mounted in a tubular work piece to be formed in a female die.

Referring more specifically to FIGURES 1 and 2, a work piece or tubular member 11 is mounted within the split tubular die 12 and an electrical discharge forming apparatus 13 is mounted within the tubular member. Forming apparatus 13 comprises spaced apart end sections or housings 14 and 15, which are slightly resilient and are preferably made of nylon or Teflon, and has a plurality of identical electrical discharge forming sections 16a, 16b and 16c. Each forming section comprises a conductor ring or electrode 18 mounted on electrically non-conductive support rods 17 and the central electrically conductive conductor rod 20, and two conductor rings or electrodes 19 mounted on the conductor rod 20. The ends 17a and 20a of rods 17 and 20, respectively, are mounted in bores 14a formed in the end section 14; and the ends 17b and 20b thereof are slip fit into holes 15a and through hole 15b, respectively, formed in the end section 15. The terminal end 20b of conductor rod 20 projects from end section 15 and is connected to electrical lead 21. Also, a through guide hole 15c is provided in the end section 15 for receipt of the firing rod 23, which is connected to electrical lead 24.

The conductor ring 18 of each of electrical discharge forming sections 16a, 16b and 16c has a central through hole 18a through which conductor rod 20 extends, two through holes 18b through which the support rods 17 extend, a guide through hole 18c through which the rod 23 extends, and a plurality of through holes 18d (which could as readily be slots) located adjacent its peripheral outer surface.

Figure 3:
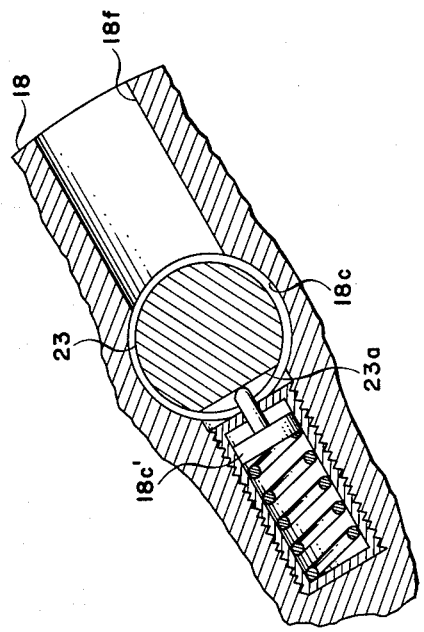
FIGURE 3 is a detailed view of a mechanism for assuring good electrical contact with the forming apparatus of FIGURE 1.

A hole 18f intersects the guide through hole 18c and threadably receives a spring loaded contact element 18c', shown in detail in FIGURE 3, which normally protrudes slightly into the through hole 18c and firmly abuts the rod 23 when fitted therein to assure that good electrical contact is made between the rod 23 and the conductor ring 18. As it is relatively difficult to determine that good electrical contact has been made with the contact element 18c' of each explosion forming section, the rod 23 may be provided with an arcuate slot 23a adjacent its reduced terminal end with which the contact element 18c' is engaged when the arcuate slot comes into alignment therewith. Release of the contact element 18c' from the slot 23a is effected simply by rotating the rod 23 to cam the contact element out of the slot. Referring back to FIGURES 1 and 2, a pliable insulator 25 having a central through hole 25a and tapered ends is press fit or otherwise secured into the central through hole 18a of ring 18 for electrically isolating the conductor ring 18 from the conductor rod 20. Each conductor ring 19 has a central through hole 19a through which the conductor rod 20 extends and a plurality of through holes 19b formed adjacent its peripheral outer surface. Each conductor ring 19 is fixed with respect to the conductor rod 20 by a set screw, and conductor rings 18 are held in place by the engagement of set screws with the support rods 17.

To ready the forming apparatus 13 for operation in accordance with this invention, the electrical discharge forming sections 16a, 16b and 16c are provided with thin, preferably aluminum wires 26a, 26b and 26c, respectively, which are threaded through the through holes 18d in each conductor ring 18 and through the through holes 19a in the conductor rings 19 disposed on each side of the conductor ring 18, and tied in place. The forming apparatus 13 thus armed is slid into the tubular member 11 which is mounted in the die 12, the split halves of which are fixedly bolted or pinned together, such that the terminal ends 11a and 11b of the tubular member are mounted in fluid-tight relation with respect to the die 12 on O-rings 12a and 12b. The end section 14 abuts the end of closure cap 12c of one end of the die and the end section 15 is snug fit in and extends through a through hole formed in the other end or closure cap 12d of the die and the closure caps are sealed with respect to the die body by seal rings interposed therebetween.

In operation, the annulus 27 between tubular member 11 and die 12 is evacuated through the evacuation line 27a which is connected to a vacuum system (not shown) and the interior of tubular member 11 is preferably filled with an energy transfer medium 30, such as water, preferably by connection of a water hose to the guide hole 15c in end piece 15 which may be provided with a hose connection for that purpose. It should be noted that the tubular member 11 could be filled with air, although water is preferred as it is a better energy transfer medium. After completion of the filling operation, the water hose is disconnected from the through hole 15c and the firing rod 23 is inserted into the guide hole 15c, the guide hole being sufficiently long and the rod 23 being sufficiently snug fit therein to prevent fluid leakage. As before mentioned, the conductor rod 20 is connected to the electrical lead 21 and the rod 23 is connected to the electrical lead 24. Leads 21 and 24 are connected by a suitable off-on switch 28 to a capacitor bank 29 of conventional design, the instantaneous voltage output of which may be adjusted from zero volts up to 50,000 volts, for example. Upon bringing the rod 23 into contact with the contact element 18c' in the guide hole 18c of the conductor ring 18 of forming section 16a, an electrical circuit is formed from one contact of switch 28 through lead 24, rod 23, contact element 18c', conductor ring or electrode 18, wires 26a, conductor rings or electrodes 19, conductor rod 20, and lead 21 back to the other contact of switch 28. Accordingly, with the firing rod 23 in contact with the contact element 18c' of the conductor ring 18 of forming section 16a, the throwing of switch 28 to the closed circuit position will permit rapid discharge of the capacitor bank 29 to thereby substantially instantaneously discharge or apply 25,000 volts, for example, across the conductor rings 19 and 18 and through the wires 26a to cause their explosion. Upon explosion of wires 26a the high velocity pressure, shock or compression waves formed by such explosion, are transmitted through the fluid 30 in the tubular member 11 and impinge with substantially equal force upon the entire area of the tubular member in contact with the fluid 30 within the sphere of influence of the pressure waves. This fluid 30 performs the important function of leveling out or distributing the force of the pressure waves along its front whereby better parts are formed. In this manner the tubular member 11 is expanded and uniformly stretched into the configuration of the female die 5 substantially radially outwardly from the forming section 16a. In a like manner, as the firing rod 23 is brought sequentially into electrical contact with the contact elements 18c' of the conductor rings 18 of each of electrical discharge forming sections 16b and 16c, the thin wires 26b and 26c thereof are exploded in sequence to ultimately form the entire part into the configuration of the female die 12. The wires of forming sections 16a, 16b and 16c could be exploded simultaneously by the engagement of firing rod 23 therewith prior to the throwing of switch 28 if a sufficiently large electrical energy source were provided.

The pressure wave formed in each of the forming sections 16a, 16b and 16c is at a maximum in the radial direction, and the sphere of influence of the pressure wave generated in each section is substantially limited to the area of the forming section in which the pressure wave is generated with a slight overlap on a diminished scale into the forming section or sections adjacent thereto. It is essential to the formation of good parts of high quality that the spheres of influence of the pressure waves generated in adjacent forming sections are over-lapping, and accordingly the forming sections are placed substantially in juxtaposition with one another.

The exploding wires 26a, 26b and 26c are completely vaporized upon exploding, and are therefore tied down in each forming section. Alternately, a hinged U-shaped clamp could be clamped around each conductor ring 19 to secure the exploding wires with respect thereto. If such a clamp were used, a single wire could be threaded through the aligned through holes of each of the conductor rings 18 and 19 and the U-shaped clamps would prevent their separation upon explosion. It should be further noted that the components of the explosion forming sections 16a, 16b and 16c are made of pliable and/or non-frangible materials to withstand the buffeting of the pressure waves formed therein and that the end sections 14 and 15 are made of resilient materials so as to absorb the shock of the pressure waves.

It will be seen from the foregoing that this invention provides a unique method of forming a member into the configuration of a die by the formation of pressure waves at selected spaced apart positions adjacent the member, preferably by the explosion of exploding wires by the application of a voltage thereto sufficient for that purpose. The exploding wires provide a relatively low resistance path between the conductor rings 18 and 19 of each forming section and permit the initiation of an arc across the conductor rings which causes their explosion. It is the rapid release of energy caused by the formation of this arc which actually creates the pressure waves operative to form the member into the configuration of the die. Accordingly, the conductor rings of each forming section could be spaced close together such that a high voltage arc applied thereto would jump the gap between them without a thin wire connected therebetween and in so doing create pressure waves operative to form the member into the configuration of the die. It should be pointed out that better quality parts are formed by use of wires interconnecting the conductor rings than without them. The reason for this is not known with certainty; however, tests indicate that the wires perform the function of shaping the pressure waves and give the pressure waves impetus by adding their mass to it upon their explosion.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of explosive forming a tubular member into a desired configuration comprising the steps of: surrounding the tubular member with a die; defining a plurality of electrical discharge forming sections physically isolated from one another within the tubular member; and sequentially discharging a high voltage electrical arc in said sections for generating pressure waves operative to form the tubular member into the configuration of the die.

2. A method of forming a tubular member into a desired configuration comprising the steps of: surrounding the tubular member with a die; filling the tubular member with an average transfer medium; defining a plurality of electrical discharge forming sections physically isolated from one another within the tubular member; and sequentially discharging a high voltage arc in each of said sections for generating high velocity pressure waves operative to form the tubular member into the configuration of the die.

3. A method of forming a tubular member into the configuration of a die comprising the steps of: surrounding the tubular member with a die; evacuating the space between the die and the tubular member; filling the tubular member with an energy transfer medium; defining a plurality of electrical discharge forming sections physically isolated from one another in the tubular member, and sequentially discharging a high voltage arc in each of said sections for generating high velocity pressure waves operative to form the tubular member into the configuration of the die.

4. Electrical discharge forming apparatus comprising:
an electrically conductive elongated support member;
insulative end members surroundingly positioned on said support member adjacent each end thereof;
at least one electrically conductive partition member carried by said support member intermediate the ends thereof and being in radial surrounding relationship with respect to said support member, said partition member being electrically insulated from said support member;
attachment means carried by said support member in electrically conductive relation therewith, there being an attachment means in each of the discharge forming sections defined by said end members and said partition member, said attachment means permitting attachment thereto of a thin wire establishing a conductive path between said attachment means and the adjacent partition member; and
selective switching means for applying a voltage between said support member and said partition member.

5. Electrical discharge forming apparatus comprising:
elongate support means;
an end member disposed on each end of said support means in surrounding relation therewith;
at least one partition member carried on said support means intermediate the ends thereof, said end members and said partition member defining therebetween a plurality of contiguous isolated discharge forming sections;
spaced apart electrically isolated conductive members located in each of said discharge forming sections; and
switching means for applying a voltage sequentially to the said conductive members in each of said discharge forming sections.

6. Electrical discharge forming apparatus comprising:
an electrically conductive elongated support member;
an electrically insulative end member disposed on each end of said support member in surrounding relation therewith;
a plurality of electrically conductive partition members disposed on said support member intermediate the ends thereof, each of said partition members being in insulative surrounding relation with respect to said support member and extending radially outwardly therefrom a substantial distance to define a plurality of contiguous isolated discharge forming sections spaced along said support member;
each of said partition members having a bore therein, said bores being aligned with respect to each other so that said bores lie on a line substantially parallel with said support member, there being another aligned bore in one of said end members; and
a rod-like conductive member disposed to be slidably inserted through said bores so that a source of voltage connected between said rod-like conductive member and said support member will enable voltage to be sequentially applied to a pair of isolated conductive members in each of said discharge forming sections.

7. Electrical discharge forming apparatus comprising:
elongate support means;
an end member associated with each end of said support means in outwardly extending relation therefrom;
at least one partition member carried on said support means intermediate the ends thereof, said end members and said partition member defining therebetween a plurality of contiguous isolated discharge forming sections;
spaced apart electrically isolated conductive members located in each of said discharge forming sections; and
selective switching means for applying a voltage to the said conductive members in each of said discharge forming sections.

References Cited by the Examiner

UNITED STATES PATENTS

| | | | |
|---|---|---|---|
| 2,779,279 | 1/57 | Marivurm | 113—44 |
| 2,976,907 | 3/61 | Harvey et al. | 113—44 |
| 3,092,165 | 6/63 | Harvey | 113—44 |
| 3,157,498 | 11/64 | Zernow et al. | 29—421 |
| 3,163,141 | 12/64 | Wesley et al. | 113—44 |

FOREIGN PATENTS 119,435  3/58  Russia.

OTHER REFERENCES

"Explosive Forming," by De Groat, American Machinist, June 15, 1959, pages 131–134.

CHARLES W. LANHAM, *Primary Examiner.*